United States Patent
Yoshida et al.

(10) Patent No.: US 12,479,733 B2
(45) Date of Patent: Nov. 25, 2025

(54) POLYSILICON ROD AND METHOD FOR MANUFACTURING POLYSILICON ROD

(71) Applicant: Shin-Etsu Chemical Co., Ltd., Tokyo (JP)

(72) Inventors: Atsushi Yoshida, Joetsu (JP); Naruhiro Hoshino, Joetsu (JP); Masahiko Ishida, Joetsu (JP); Takeshi Aoyama, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/479,801

(22) Filed: Oct. 2, 2023

(65) Prior Publication Data

US 2024/0025754 A1 Jan. 25, 2024

Related U.S. Application Data

(63) Continuation of application No. 17/353,509, filed on Jun. 21, 2021, now abandoned.

(30) Foreign Application Priority Data

Jun. 23, 2020 (JP) .................. 2020-108123

(51) Int. Cl.
 *C01B 33/035* (2006.01)
(52) U.S. Cl.
 CPC ........ *C01B 33/035* (2013.01); *C01P 2002/60* (2013.01); *C01P 2004/02* (2013.01)

(58) Field of Classification Search
 CPC ............... C01B 33/035; C01P 2002/60; C01P 2004/02; C30B 15/00; C30B 28/08; C30B 29/06
 See application file for complete search history.

(56) References Cited

U.S. PATENT DOCUMENTS

| | | | |
|---|---|---|---|
| 6,840,998 B2* | 1/2005 | Altmannshofer | C30B 29/06 428/64.1 |
| 2008/0286550 A1* | 11/2008 | Sofin | C01B 33/035 427/248.1 |
| 2014/0004377 A1 | 1/2014 | Kaito | |

(Continued)

FOREIGN PATENT DOCUMENTS

| | | |
|---|---|---|
| JP | 2008285403 A | 11/2008 |
| JP | 2013193902 A | 9/2013 |

(Continued)

OTHER PUBLICATIONS

Miyao et al. JP2014031297A English Machine Translation (Year: 2014).*

(Continued)

*Primary Examiner* — Sally A Merkling
*Assistant Examiner* — Jordan W Taylor
(74) *Attorney, Agent, or Firm* — Ladas & Parry, LLP

(57) ABSTRACT

A polysilicon rod wherein in an area whose distance from a center of a cross section of the polysilicon rod is within ⅔ of a radius and that excludes a seed core, average grain boundary characteristics have following features: a coincidence grain boundary ratio exceeds 20%, a grain boundary length exceeds 550 mm/mm², and a random grain boundary length does not exceed 800 mm/mm².

3 Claims, 7 Drawing Sheets

(56) References Cited

U.S. PATENT DOCUMENTS

| | | |
|---|---|---|
| 2015/0047554 A1 | 2/2015 | Miyao et al. |
| 2015/0107508 A1 | 4/2015 | Ishida et al. |
| 2016/0116423 A1 | 4/2016 | Miyao et al. |
| 2017/0016143 A1* | 1/2017 | Yang ..................... H10D 62/40 |
| 2018/0002180 A1* | 1/2018 | Miyao ................... C01B 33/035 |
| 2019/0017193 A1 | 1/2019 | Miyao et al. |

FOREIGN PATENT DOCUMENTS

| | | | |
|---|---|---|---|
| JP | 2013217653 A | | 10/2013 |
| JP | 2014028747 A | | 2/2014 |
| JP | 2014031297 A | * | 2/2014 |
| JP | 2015003844 A | | 1/2015 |
| JP | 2016150885 A | | 8/2016 |
| JP | 2017197431 A | | 11/2017 |
| JP | 2019019010 A | | 2/2019 |
| WO | 2007004631 A1 | | 1/2007 |

OTHER PUBLICATIONS

Ciszek et al. (Journal of Crystal Growth 2002, 237-239, 1685-1691) (Year: 2002).*
Office Action from corresponding Japanese Patent Application No. 2020-108123 dated May 9, 2023, and its machine English translation from Global Dossier.

* cited by examiner

Σ 3 COINCIDENCE GRAIN BOUNDARY(BLACK LINE)

MAPPING MAIN GRAIN BOUNDARIES ON IMAGE QUALITY (IQ)

Σ 9 COINCIDENCE GRAIN BOUNDARY(BLACK LINE)

MAPPING MAIN GRAIN BOUNDARIES ON IMAGE QUALITY (IQ)

RANDOM GRAIN BOUNDARY (BLACK LINE)
Σ 3 to 49 COINCIDENCE GRAIN BOUNDARY(WHITE LINE)

MAPPING MAIN GRAIN BOUNDARIES ON IMAGE QUALITY (IQ)

POLYSILICON ROD AND METHOD FOR MANUFACTURING POLYSILICON ROD

CROSS-REFERENCE TO RELATED APPLICATIONS

The present application is a continuation of U.S. application Ser. No. 17/353,509 filed on Jun. 21, 2021, which claims priority to Japanese Patent Application No. JP 2020-108123 filed on Jun. 23, 2020, the disclosures of which are incorporated herein by reference in their entireties.

TECHNICAL FIELD

The present invention relates to raw polysilicon for improving the defect rate in the manufacture of single crystal and a method for manufacturing the same.

The present application claims the priority of Japanese Patent Application No. 2020-108123 filed on Jun. 23, 2020, the contents of which are entirely incorporated by reference.

BACKGROUND ART

In the manufacture of semiconductor devices, the manufacturing process of single crystal silicon is required to control impurities, lattice defects, etc., and maintain productivity. Examples of the currently mainstream method for manufacturing single crystal include a floating zone (FZ) method and a Czochralski (CZ) method. Of the two methods, the FZ method is a method of directly heating a polysilicon rod by high-frequency heating to obtain single crystal, which has more features favorable for controlling impurities than the CZ method using a quartz crucible.

A defect in the FZ method means that single crystal growth is inhibited and dislocation occurs, and a crystal defect is caused in a single crystal rod. One of the factors that inhibit the single crystal growth is a phenomenon in which polysilicon is left unmelted to cause the defect.

In this FZ method, the crystal characteristics of the raw polysilicon rod used are greatly associated with the defect in the FZ that occurs during the manufacture of single crystal.

In the course of the single crystal growth in the FZ method, the occurrence of the defect in the FZ is an important problem because it significantly lowers productivity.

Manufacture of polysilicon rods as a raw material in the FZ method is mainly performed by a Siemens method that is a CVD method in which silane gas as a raw material is precipitated on a heated silicon rod in the air.

Each of JP 2008-285403 A, JP 2013-193902 A, JP 2014-28747 A, and JP 2017-197431 A discloses a polysilicon rod characterized by its acicular crystal, area ratio of coarse grains, and size of a crystal grain. Each of JP 2013-217653 A, JP 2015-3844 A, and JP 2016-150885 A discloses a method for selecting a single crystal raw material according to the peak intensities and the numbers of peaks of Miller indices <111> and <220> by an X-ray diffraction method. JP 2019-19010 A discloses a polysilicon rod characterized by the size of a crystal grain and the diffraction intensity of a Miller index <222> by an X-ray diffraction method.

SUMMARY OF INVENTION

Problem to be Solved by Invention (1) None of the methods of the aforementioned patent documents can provide high quantitativeness and reproducibility. This is because attention has been paid to coarse grains of polysilicon (size, distribution, crystal orientation, etc.) as a cause of the single crystallization defect in the FZ method, which is insufficient alone.

The present invention provides a polysilicon rod in which the single crystallization defect in the FZ method is reduced by the ratio of the breadth of a grain boundary surface to coincidence grain boundary, which is a feature of a grain boundary that is a boundary surface between particles.

For example, a silicon rod having the largest crystal grain is a single crystal silicon rod, and when a model in which this single crystal silicon rod is single-crystallized by the FZ method is considered, it can be said that the defect rate due to the raw material is zero. When this single crystal is divided, a grain boundary surface appears. A coincidence grain boundary closest to a single crystal bond is $\Sigma 3$, and a grain boundary surface having no coincidence lattice point or having no regularity is a random grain boundary. It can be said that a grain boundary containing a large amount of $\Sigma 3$ that is a bonding surface closest to single crystal is close to single crystal.

(2) A reactor for performing a CVD reaction by the Siemens method is generally a bell jar type. The inner wall of a reactor receives radiation from a heated rod. When the inner wall is in a mirror surface state, the reflectance is high and an effect of returning the radiant energy from the rod to the rod can be obtained, but when the inner wall is fogged, the reflectance is decreased, so that the absorption of the energy into the wall surface is increased and the energy is not returned to the rod. The cause of the fogging is that chlorosilanes as a raw material cause hydrolysis with the moisture in the air when the reactor is opened between batches, so that the reflectance tends to be decreased with each batch. As a result, it is difficult to manufacture polysilicon rods under the same conditions at all times. Polysilicon having a desired grain boundary can be manufactured by feeding back the grain boundary characteristics of the previous batch to the reaction conditions of the next batch.

Means for Solving Problem

An inhibitor for single crystallization by the FZ method is included in the characteristics of a grain boundary surface, and by measuring and analyzing it, and feeding back to the manufacturing conditions, polysilicon rods suitable for single crystallization by the FZ method can be manufactured.

When the single crystallization process of the FZ method is looked at, an area near the center of a polysilicon rod is easily affected by a grain boundary because it reaches a single crystal growth surface immediately after being melted, while an area near the outer periphery of the polysilicon rod is less affected than the area near the center because it passes through a heating zone by an induced current.

Specifically, for the area to be the center at the time of single crystallization by the FZ method, an area having a small random grain boundary length and a large grain boundary length is favorable, and as the distance from the center becomes larger, even an area having a smaller grain boundary length becomes acceptable.

Therefore, the rod containing polysilicon is beneficial, in which in an area whose distance from the center of the cross section of the polysilicon rod is within $2/3$ of the radius and that excludes the seed core, the average coincidence grain boundary ratio exceeds 20%, the average grain boundary length exceeds 550 mm/mm$^2$, and the average random grain boundary length does not exceed 800 mm/mm². Further, the polysilicon rod is favorable, in which the coincidence grain boundary ratio exceeds 25%, the grain boundary length exceeds 650 mm/mm², and the random grain boundary length does not exceed 700 mm/mm².

When it is applied to the entire polysilicon rod, the rod containing polysilicon is beneficial, in which in an area including the entire polysilicon rod but the seed core, the average coincidence grain boundary ratio exceeds 20%, the average grain boundary length exceeds 550 mm/mm², and the average random grain boundary length does not exceed 800 mm/mm². Further, the polysilicon rod is favorable, in which the coincidence grain boundary ratio exceeds 25%, the grain boundary length exceeds 650 mm/mm², and the random grain boundary length does not exceed 700 mm/mm².

The closer the coincidence grain boundary ratio is to 100%, the better. However, the manufacturing conditions for realizing this is close to those for epitaxial film growth, so that there is little cost advantage with current technology. In addition, when the grain boundary length is intended to be increased, it is also necessary to increase the coincidence grain boundary ratio in order to reduce the random grain boundary length to 700 mm/mm² or less, so that it is realistic from the above reason that the grain boundary length is 3000 mm/mm² or less.

In the method for manufacturing a polysilicon rod by the Siemens method, the environment inside a reactor gradually changes as described above. Therefore, it is considered that polysilicon is analyzed at constant intervals and the results are fed back to the CVD conditions. The coincidence grain boundary ratio that is a feature of a grain boundary, the grain boundary length that is an index of the breadth of a grain boundary, and the random grain boundary length obtained from them are quantitative values and characterized by being able to be associated with manufacturing conditions. Also, in product design, the grain boundary characteristics from the inner periphery to the outer periphery of a polysilicon rod can be controlled, so that polysilicon rods according to the requirements of customers can be provided.

According to one aspect of the present invention,
1. the defect rate in single crystallization by the FZ method can be reduced, and the yield and productivity can be improved, and
2. polysilicon rods can be stably manufactured by feedback from the grain boundary characteristics to the manufacturing conditions.

DETAILED DESCRIPTION

A horizontal plane orthogonal to the growth direction of a polysilicon rod is cut out, and the crystal orientations of the crystal grains exposed on a measurement surface are entirely measured at an electron backscatter diffraction (EBSD) step of 1 μm, whereby the state of a grain boundary is calculated from differences between the orientations/angles of adjacent crystals of the obtained data matrix. A Σ3 coincidence grain boundary means a grain boundary surface where one coincidence lattice point appears with respect to three atoms, which can be said to be a grain boundary surface closest to single crystal among coincidence grain boundaries. It can be said that when a grain boundary has more coincidence lattice points, the thermal and physical properties of the grain boundary are closer to those of single crystal.

Coincidence Grain Boundary Ratio

The Σ3 to 49 detected using an EBSD analysis software (TSL Solutions KK) are defined as coincidence grain boundaries. About 80% of all the coincidence grain boundaries of Σ3 to 49 are occupied by Σ3 and Σ9, in which Σ3 is slightly more than Σ9. As the Σ value becomes larger, the interval between coincidence lattice points becomes larger, which becomes closer to a random grain boundary. Therefore, in the present embodiment, a coincidence grain boundary ratio is calculated by using the sum of Σ3 to Σ9 coincidence grain boundaries, which is adopted as an index. Here, Σ1 means single crystal.

Since the grain boundary is a boundary between grains, it is obtained as a surface when surface observation is performed, so that the grain boundary is indicated as an area. However, the information obtained by a measurement using an actual apparatus becomes a line (becomes the length of a boundary line around when surface observation is performed).

Figure 3A:
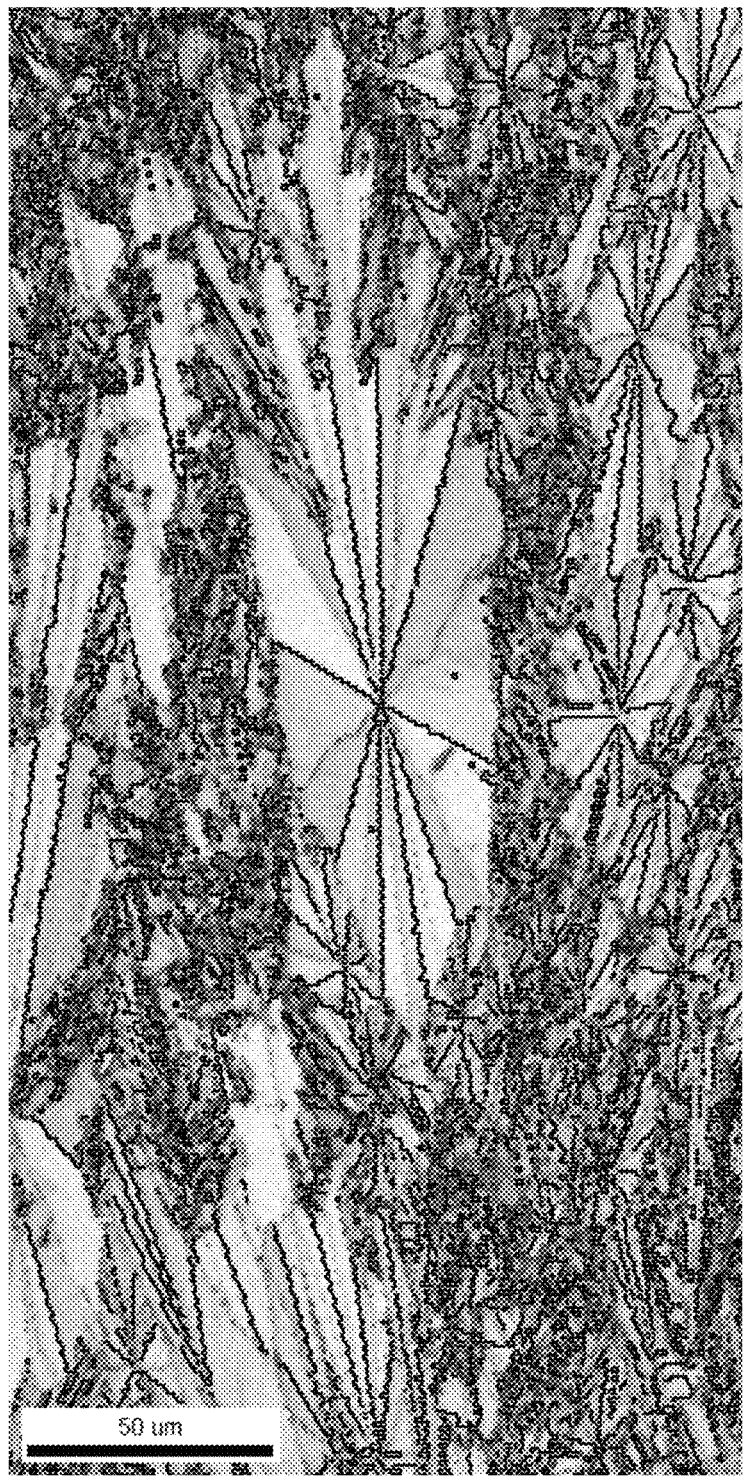
FIG. 3A is a view showing images of Σ3 coincidence grain boundaries.
Figure 3B:
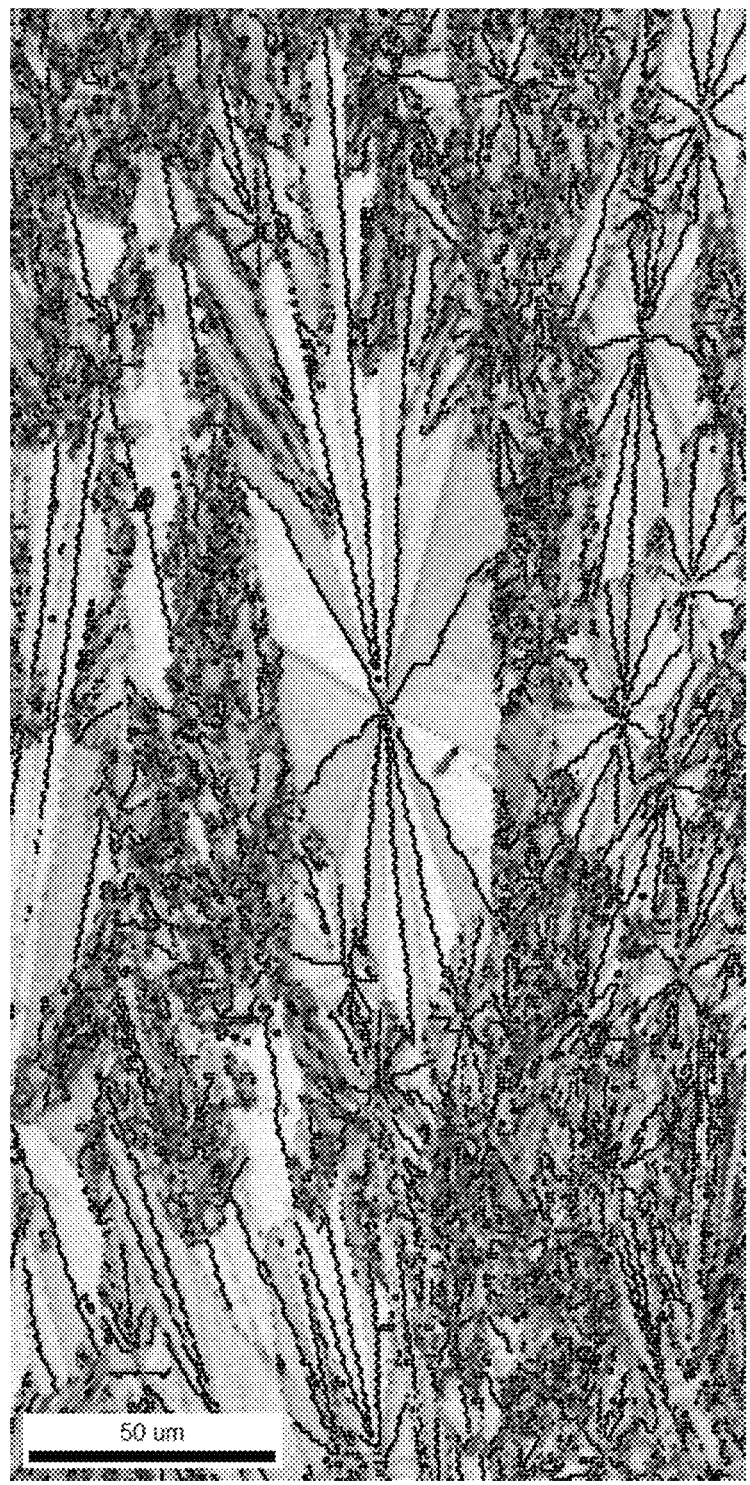
FIG. 3B is a view showing images of Σ9 coincidence grain boundaries.
Figure 3C:
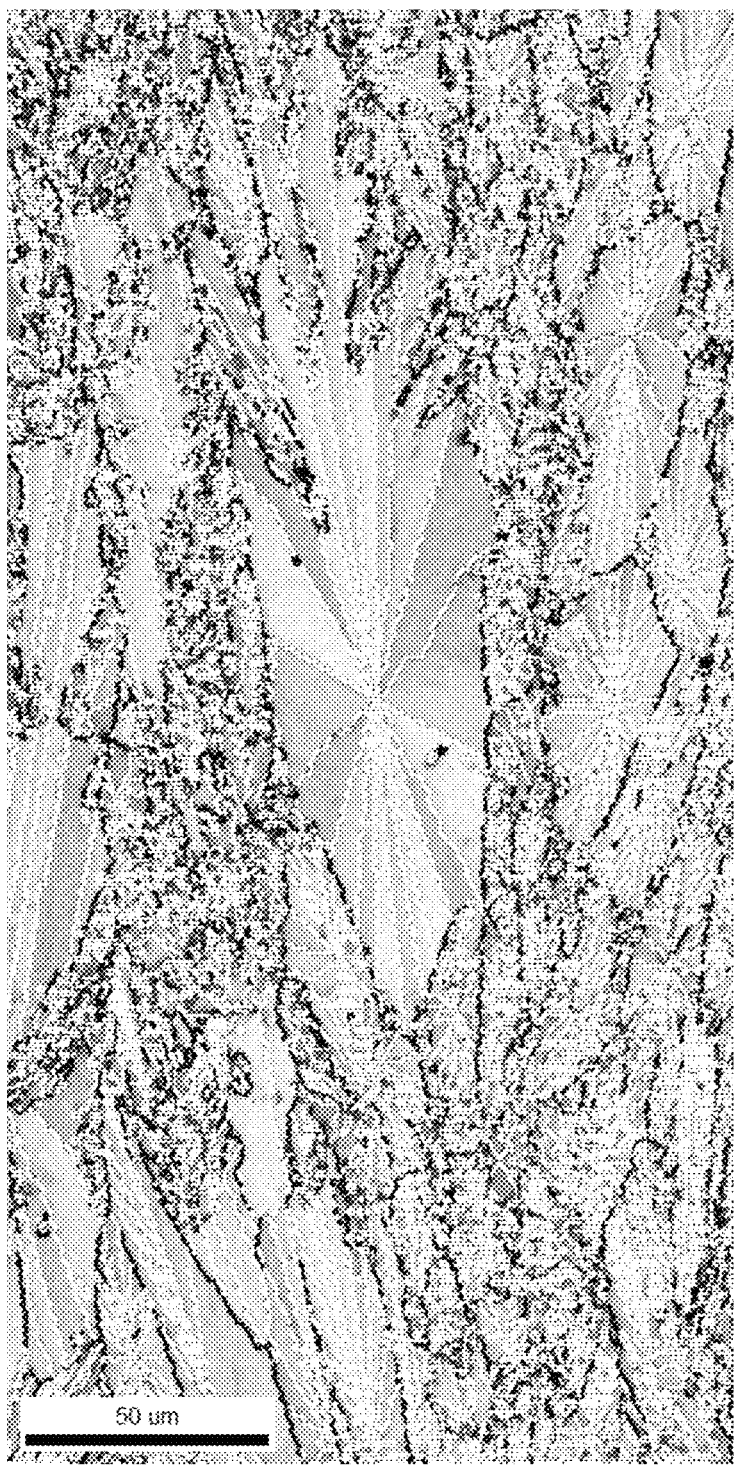
FIG. 3C is a view showing images of random grain boundaries, and Σ3 to 49 coincidence grain boundaries.

Therefore, in the present embodiment, the coincidence grain boundary ratio is defined as follows (see FIGS. 3A to 3C):

coincidence grain boundary ratio (%)=boundary lines of observed coincidence grain boundaries/boundary lines of observed grain boundaries.

The boundary lines include boundary lines exceeding Σ49. The "boundary lines of observed grain boundaries" in the above expression are all the grain boundaries observed by the above EBSD analysis software. In the present embodiment, the "Σ3 to 49" are referred to as coincidence grain boundaries as described above. The boundary lines in the coincidence grain boundaries are about 50 to 60% of the "boundary lines of observed grain boundaries."

In the EBSD analysis software, the orientations (angles) of crystals on an observation surface are measured at intervals of, for example, 1 μm in the case of ×150. When there is a difference of a certain angle or more in the changes in the obtained continuous data, it is regarded as a grain boundary. The coincidence grain boundaries of "Σ3 to 49" can be obtained from the orientations and directions of the crystals with the grain boundary interposed therebetween.

It becomes boundary lines of observed grain boundaries>boundary lines of "Σ3 to 49 coincidence grain boundaries">boundary lines of "Σ3 to Σ9 coincidence grain boundaries". The boundary lines of observed grain boundaries include the coincidence grain boundaries and grain boundaries that are not the coincidence grain boundaries. Therefore, the coincidence grain boundary ratio is obtained by dividing the sum of the boundary lines of "Σ3 to Σ9 coincidence grain boundaries" by the sum of the boundary lines of "Σ3 to 49 grain boundaries" and the boundary lines exceeding Σ49.

A grain boundary having a low coincidence lattice point density (a grain boundary close to a random grain boundary) has high energy and is unstable. Therefore, when there are many grain boundaries each having a low coincidence lattice point density, it triggers falling off of unmelted particles on an FZ melt surface, causing an FZ defect. On the other hand, when a polysilicon rod having physical properties close to those of single crystal is used as a raw material in the FZ method, stable melting can be obtained.

Grain Boundary Length

It is difficult to accurately measure the grain size of single crystal in polysilicon because a grain boundary surface cannot currently be determined by images of SEM or the like. By measuring the crystal orientation for each particle using the above EBSD or the like, the length of a grain boundary on the measurement surface can be obtained, so that the average size of particles can be indirectly expressed. When the sum of the length of grain boundaries on the measurement surface is divided by the measured area, a grain boundary length per unit area can be obtained. In the present embodiment, this is defined as a grain boundary length (unit: length/area) that is an index of the breadth of a grain boundary surface.

Random Grain Boundary Length

Various coincidence grain boundaries are included in the grain boundaries other than the Σ3 to Σ9 coincidence grain boundaries. As the Σ value becomes larger, the interval between the coincidence lattice points becomes larger, so that the features of a grain boundary having a low Σ value (having low grain boundary energy and being stable) are lost. Therefore, the sum of Σs larger than Σ9 is defined as a random grain boundary, for convenience, and a random grain boundary length is determined from the grain boundary length per unit area. That is, when the sum of the length of grain boundaries which have Σs larger than Σ9 on the measurement surface is divided by the measured area, a random grain boundary length per unit area can be obtained.

In order to reduce crystal defects and increase the yield in the FZ method, it is favorable to use, as a raw material, one having a grain boundary length as long as possible, a low Σ value, a large coincidence grain boundary ratio, and a small random grain boundary length. However, the coincidence grain boundary ratio and the grain boundary length are in a contradictory relationship for the most part. For example, in the polysilicon manufactured under the condition of increasing the coincidence grain boundary ratio, its grain boundary length is small. Therefore, it is important to find the best point for both the grain boundary characteristics.

The cause of the falling off of crystal particles, which inhibits single crystal growth, is that the bonding at a grain boundary surface is weak and unstable. As the number of random grain boundaries with less bonding of coincidence lattice points becomes larger, peeling off and falling off from the melt surface are more likely to occur. It can be said that when of the grain boundary characteristics, the Σ value is small and the coincidence grain boundary ratio is large, the bonding at a grain boundary surface is strong and stable, so that the falling off of crystal particles is less likely to occur. The falling off of crystal particles due to a random grain boundary occurs at a temperature lower than the melting temperature of the single crystal because the energy at the grain boundary surface is high. Therefore, the single crystal particles that have fallen off are not sufficiently heated and melted, and reach the single crystal growth surface while the unmelted and semi-melted particles are in a cluster form, causing a crystal defect. The unmelted and semi-melted particles depend on the sizes of the crystal particles that have fallen off. The larger the size is, the longer the existence time is, so that they are more likely to reach the single crystal growth surface.

Factors of the manufacturing conditions to obtain desired grain boundary characteristics include the temperature of the surface of a rod, reaction pressure, the concentration of silane as a raw material, etc. When a regression analysis is performed on these, a correlation of $R^2=0.8$ or more (R: coefficient of determination) is obtained. The same applies to a case where the number of parameters is further increased and machine learning is used. The obtained correlation is used as feedback to an apparatus, so that optimum reaction conditions that follows the changes in the state inside the reactor can be set.

While the diameters of the apparatuses are becoming larger In the FZ method, conventional small-diameter apparatuses are also often used. The grain boundary characteristics required for each apparatus are different. In even an apparatus of the same type, there are so-called equipment peculiarities, but polysilicon rods that meet needs can be manufactured by performing the present analysis.

Figure 4:
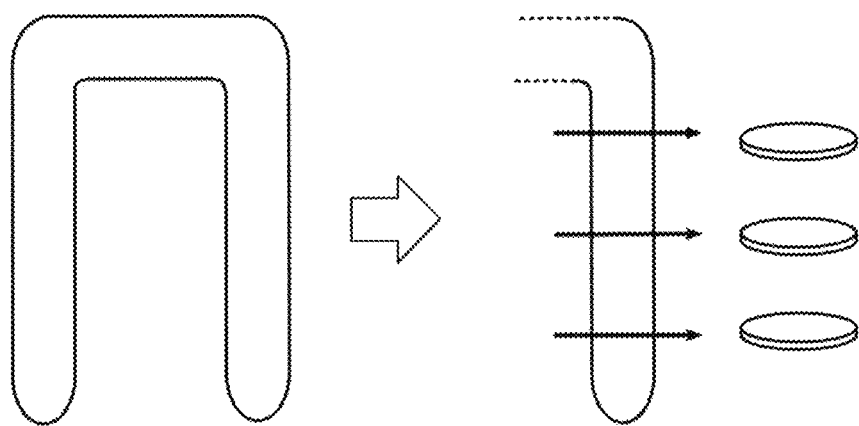
FIG. 4 is a schematic view for explaining the outline of a measurement method 1 in an embodiment of the present invention.

As the measurement method, for example, an aspect (hereinafter, also referred to as a "measurement method 1") as shown in FIG. 4 may be used. The prepared silicon rod is cut at arbitrary positions (three positions in the aspect shown in FIG. 4) and sliced, whereby samples are cut out. The samples thus obtained are measured. Since the characteristics of both the feet of a U-rod are basically the same, the measurement may be performed only on one foot.

The measurement results show that in all the cut-out samples, the yield in the FZ becomes good according to the following conditions in which: in an area whose distance from the center of the cross section of the polysilicon rod is within ⅔ of the radius and that excludes the seed core, the average coincidence grain boundary ratio exceeds 20%, the average grain boundary length exceeds 550 mm/mm$^2$, and the average random grain boundary length does not exceed 800 mm/mm$^2$; or in an area including the entire polysilicon rod but the seed core, the average coincidence grain boundary ratio exceeds 20%, the average grain boundary length exceeds 550 mm/mm$^2$, and the average random grain boundary length does not exceed 800 mm/mm$^2$.

Therefore, it can be expected that favorable results will be obtained even with the polysilicon rods of subsequent batches that will be manufactured under the same conditions. Since the wall surface of the reactor loses its luster and the efficiency of the radiant heat changes every time a batch is processed, the environment inside the reactor gradually changes even under the same conditions, but this change is not dramatic. Therefore, for a certain period of time (e.g., for about one month), it can be expected that favorable results will be obtained even with polysilicon rods of batches that will be manufactured under the same conditions.

When measurement results are favorable by meeting the above conditions, products with a good yield can be manufactured when the FZ is performed by using the foot that has not been cut out into slices in FIG. 4. The foot, from which the sliced samples are obtained in FIG. 4, may be used as a chunk for the CZ.

For example, the procedure as described below can be taken.

Measurement is performed using the measurement method 1, and the foot, which is opposite to the foot that has passed by meeting the above conditions, is subjected to single crystal growth by the FZ (if the manufacturing apparatus is of the same type, one is regarded as a representative).

At this time:
the measurement method 1 may be performed on every silicon rod in the same chamber that has grown into a silicon core wire, and if they pass by meeting the above conditions, the foot, which is opposite to the foot that has passed, may be subjected to single crystal growth by the FZ;
the measurement method 1 may be performed on a representative of those outside the chamber, like the representative of those inside the chamber, and if it passes by meeting the above conditions, the rest of those may be subjected to single crystal growth by the FZ; or
one representative may be measured by the measurement method 1, and if it passes by meeting the above conditions, the rest may be subjected to single crystal growth by the FZ.

Figure 5:
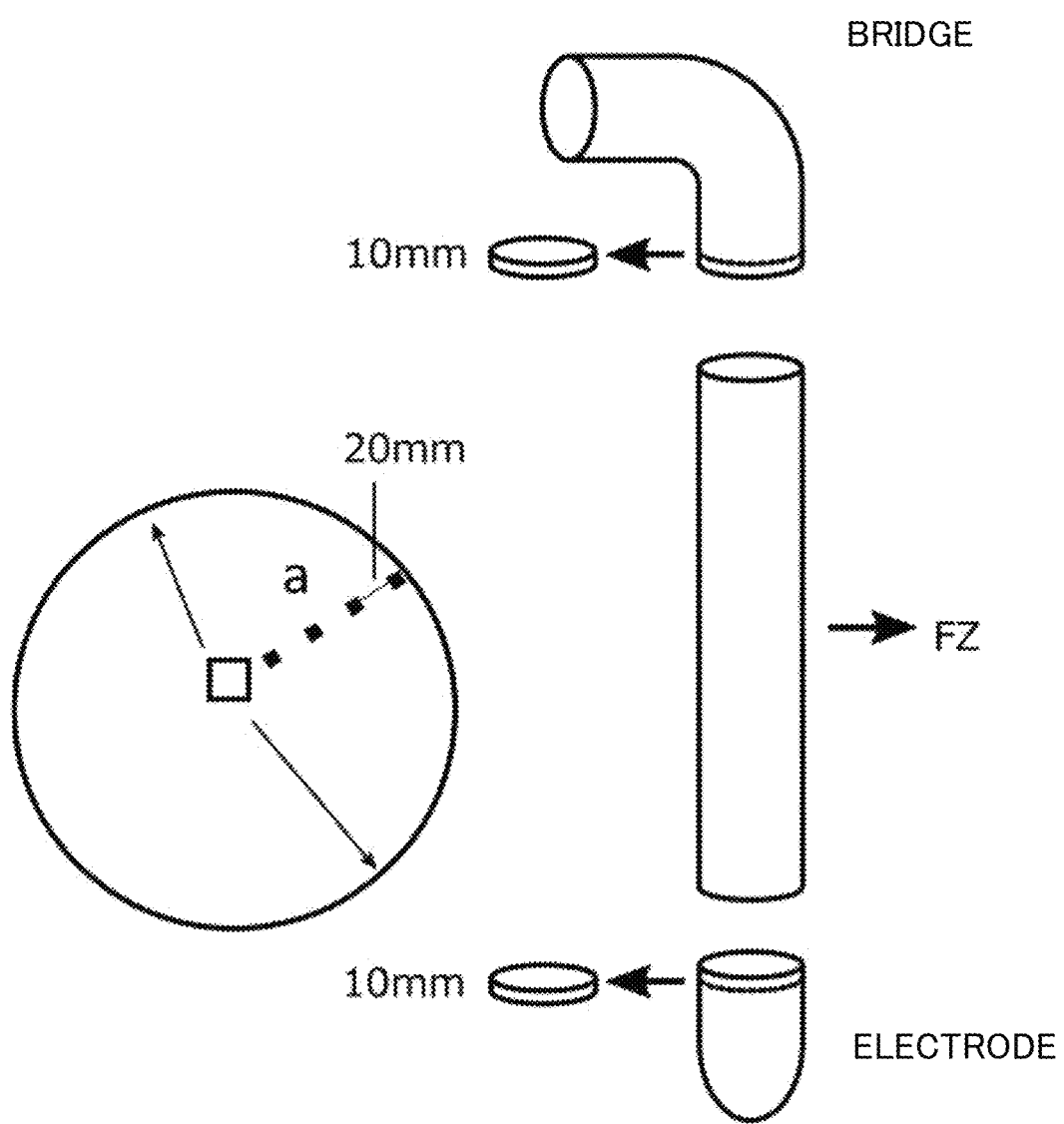
FIG. 5 is a schematic view for explaining the outline of a measurement method 2 in the embodiment of the present invention.

In addition, areas near the electrode and the bridge are excluded from the viewpoint of quality, and the central portion having no cracks is used as an ingot for the FZ, so that, for example, an aspect as shown in FIG. 5 may be adopted as another measurement method.

According to the aspect (hereinafter, also referred to as a "measurement method 2") in which an upper portion near the bridge and a lower portion near the electrode are only cut out to make samples, as shown in FIG. 5, a rod for the FZ can also be acquired in the foot from which the samples have been made. A sample for quality evaluation is taken from a portion outside the effective length of the ingot for the FZ, mainly from the vicinity of the electrode. The sample is analyzed to determine a resistance value, metal components, etc.

In the measurement method 2, for example, the following procedure can be taken.

A foot is measured by the measurement method 2, and the foot, which has passed by meeting the above conditions, and its opposite foot are both subjected to single crystal growth by the FZ (if the manufacturing apparatus is of the same type, one is regarded as a representative).

At this time:
all samples may be inspected by the measurement method 2, and rods, which have passed by meeting the above conditions, may be subjected to single crystal growth by the FZ;
the measurement method 2 may be performed on a representative of those outside the chamber, like the representative of those inside the chamber, and if it passes by meeting the above conditions, all of the those may be subjected to single crystal growth by the FZ method; or
one presentative may be measured by the measurement method 2, and if it passes by meeting the above conditions, all may be subjected to single crystal growth by FZ.

If inspection results are different even when a manufacturing apparatus of the same type is used, or if the same silicon rods cannot be manufactured even when manufactured under the same manufacturing conditions, either of the measurement methods 1 and 2 may be performed in each apparatus.

The cause of the case where characteristics are gradually lost as the lot is increased with the same apparatus is thought to be that deposits are deposited inside the bell jar, which leads to a decrease in the radiant heat.

Even in this case, the manufacturing conditions may be continuously reviewed, or the inside of the bell jar may be cleaned to return to the initial state. However, if electropolishing is performed to clean the inside of the bell jar, the cost is highly expensive. Therefore, it is a realistic choice to continue to review the manufacturing conditions.

EXAMPLES

<Relationship Between FZ Results and Grain Boundary Characteristics>

Preparation of Polysilicon Rod

Figure 1:
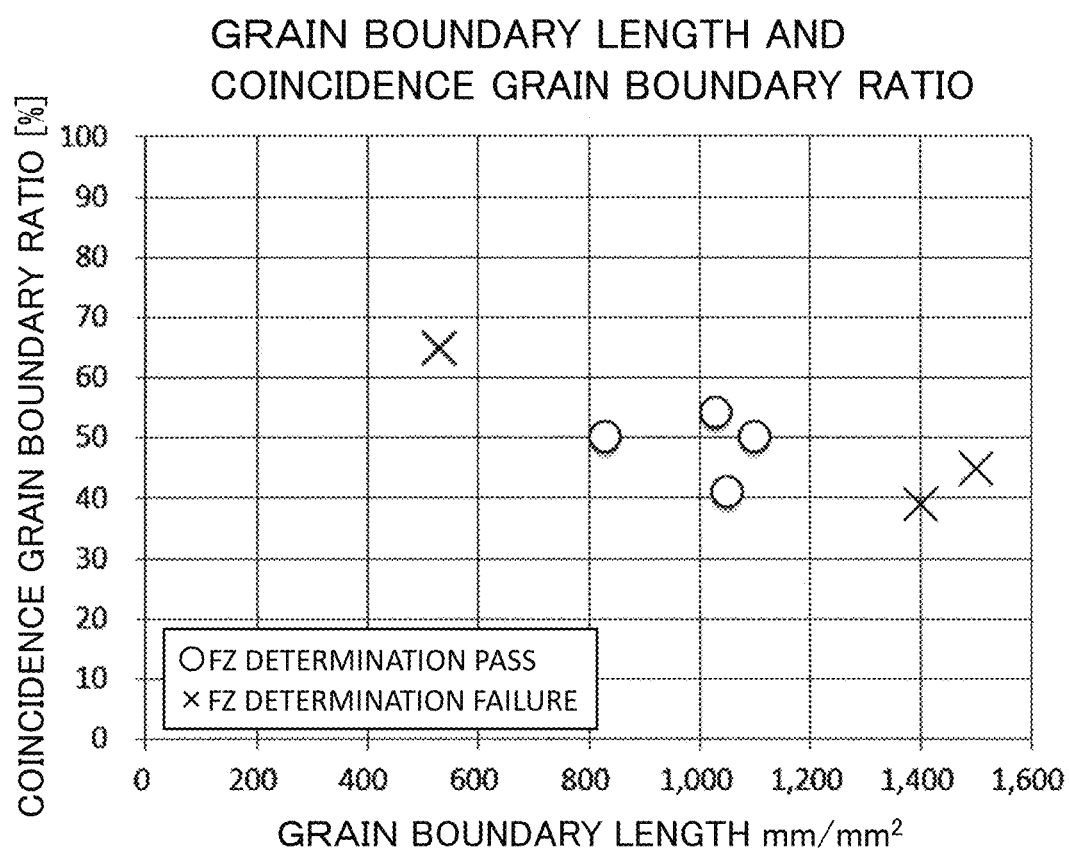
FIG. 1 is a graph showing the relationship between a grain boundary length and a coincidence grain boundary ratio.

A crystal sample was prepared by the Siemens method using trichlorosilane and hydrogen as raw materials, the grain boundary characteristics were measured by EBSD, and the results of actual pull-out experiments by the FZ method are shown below. A sample, in which dislocation occurred in its crystal as a result of a single crystallization experiment by the FZ method, was determined as ×(failure). The measurement results are also shown in FIG. 1.

TABLE 1

| | Coincidence grain boundary ratio % | Grain boundary length $mm/mm^2$ | Random grain boundary length $mm/mm^2$ | FZ Determination |
|---|---|---|---|---|
| 1 | 65 | 530 | 470 | × |
| 2 | 54 | 1030 | 190 | ○ |
| 3 | 39 | 1400 | 850 | × |
| 4 | 50 | 1100 | 550 | ○ |
| 5 | 41 | 1050 | 620 | ○ |
| 6 | 45 | 1500 | 830 | × |
| 7 | 50 | 830 | 420 | ○ |

Sampling for Grain Boundary Characteristics Measurement

Since it was not realistic to measure the grain boundary characteristics of the entire rod, average grain boundary characteristics were determined by sampling.

1) Wafers each having a thickness of 10 mm were cut out from both ends of an effective length (the electrode side and the bridge side were removed) of a U rod taken out from a Siemens method CVD apparatus (see FIG. 5).

2) A line segment a was drawn from the outer periphery to the seed core of the wafer, the line segment a bisecting, on the acute angle side, the angle formed between lines that are drawn to extend from the outer periphery to the seed core of the wafer in a portion where the line is the largest and a portion where the line is shortest.

3) Samples were cut out at intervals of 20 mm from the core wire along the line segment a. For each sample, a measurement range of 0.5 mm×0.5 mm or more was measured with an EBSD apparatus (manufactured by TIM Inc.) Step of 1.0 microns, and average grain boundary characteristics were determined. Note that calculation was performed in consideration of performing cylindrical grinding in a later step.

4) For sections in which reaction conditions (factors that affect a grain boundary, such as the temperature of a rod, reaction pressure, raw material concentration, raw material supply speed, CVD apparatus, and radiant heat that a rod receives from outside) were the same in the radial growing direction throughout a reaction batch, the characteristics of the entire sections were determined by measuring a representative point.

Example of Analysis of Reaction Conditions and Feedback

An example is taken, in which: in an apparatus for manufacturing polysilicon by the Siemens method, the apparatus having a function of keeping a constant temperature by generating heat by making a current flow through the seed core of the polysilicon that is connected to the electrode, and the gas phase portion of the apparatus being filled with hydrogen and chlorosilane, a deposited layer of polysilicon is formed on the surface of the seed core of heated silicon, thereby forming a polysilicon rod.

Figure 2:
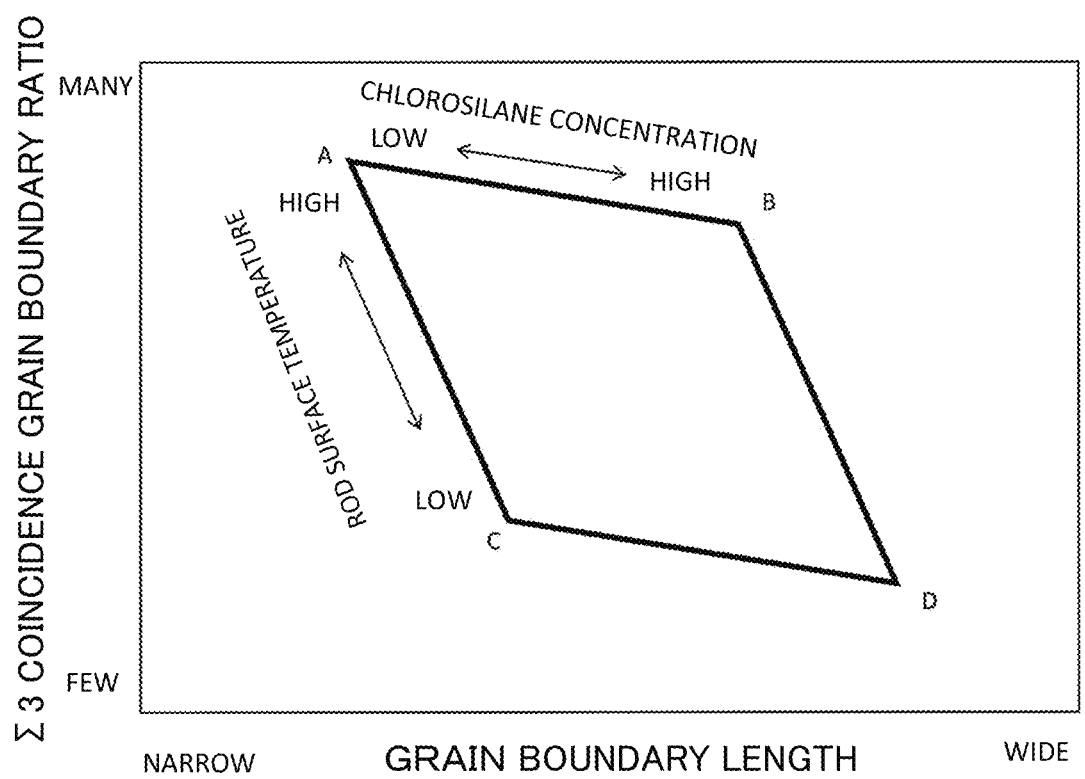
FIG. 2 is a graph showing the relationship between a grain boundary length and a Σ3 coincidence grain boundary ratio.

As the reaction conditions, a chlorosilane concentration and the temperature of the surface of the polysilicon rod during the CVD reaction were taken, and the relationships with grain boundary characteristics were analyzed. Results of the analysis are schematically shown in FIG. 2. Assuming that the point A is the current condition, the grain boundary characteristics change in the direction of the point B when the chlorosilane concentration is only changed to be higher from the condition of the point A. When the temperature of the rod is only lowered from the condition of the point A, the grain boundary characteristics change in the direction of the point C. When the chlorosilane concentration is set to the condition of the point B and the temperature of the rod is set to the condition of the point C, polysilicon having the grain boundary characteristics of the point D is obtained.

By applying the actual measurement results to FIG. 2 and maintaining the latest state, optimal reaction conditions for obtaining a polysilicon rod with desired grain boundary characteristics can always be adjusted.

Method 1 of Feedback to Manufacturing Conditions:

As a method for designing the grain boundary characteristics from the center to the outer periphery of a polysilicon rod, the temperature of the surface of the rod is relatively raised in order to increase a region where the coincidence grain boundary ratio is increased when the diameter is small, while the temperature of the surface of the silicon rod is made lower and the chlorosilane concentration is made higher (to prevent the heat inside the silicon rod from rising) in order to increase the grain boundary length as the diameter becomes larger. Thereby, a polysilicon rod having a "proper region" can be manufactured.

Method 2 of Feedback to Manufacturing Conditions:

As the diameter becomes larger, a higher frequency is applied to raise the temperature of the surface (by preventing the heat inside the silicon rod from rising, the temperature of the surface can be raised), and the chlorosilane concentration in the chamber is made higher. Thereby, a polysilicon rod having a "proper region" can be manufactured.

What is claimed is:

1. A method for manufacturing a single crystal silicon comprising:
   manufacturing a polysilicon rod or polysilicon rods;
   selecting a representative polysilicon rod from the polysilicon rod or the polysilicon rods;
   determining boundary features of the representative polysilicon rod in an area including the entire representative polysilicon rod excluding a seed core;
   selecting a polysilicon rod or polysilicon rods satisfying the boundary features, where the boundary features are a coincidence grain boundary ratio that exceeds 20%, a grain boundary length that exceeds 550 mm/mm$^2$, and a random grain boundary length that does not exceed 800 mm/mm$^2$; and
   manufacturing the single crystal silicon by a floating zone (FZ) method using the polysilicon rod or polysilicon rods that satisfy the boundary features along with raw materials.

2. The method for manufacturing the single crystal silicon according to claim 1, wherein the coincidence grain boundary ratio exceeds 25%, the grain boundary length exceeds 650 mm/mm$^2$, and the random grain boundary length does not exceed 700 mm/mm$^2$.

3. The method for manufacturing the single crystal silicon according to claim 1, wherein the coincidence grain boundary ratio does not exceed 90%, and the grain boundary length does not exceed 3000 mm/mm$^2$.

* * * * *